STRETCHED REFERENCE WIRE MAGNETIC PICKUP ALIGNMENT SYSTEM

Filed March 22, 1967 4 Sheets-Sheet 1

INVENTORS
WOLFGANG K.H. PANOFSKY
WILLIAM F. MARSHALL
BY
ATTORNEY

INVENTORS
WOLFGANG K.H. PANOFSKY
WILLIAM F. MARSHALL
BY
ATTORNEY

INVENTORS
WOLFGANG K.H. PANOFSKY
WILLIAM F. MARSHALL
BY
Roland A. Anderson
ATTORNEY INVENTORS
WOLFGANG K.H. PANOFSKY
WILLIAM F. MARSHALL
BY
Roland A. Anderson
ATTORNEY United States Patent Office 3,470,460

Patented Sept. 30, 1969

3,470,460

STRETCHED REFERENCE WIRE MAGNETIC PICKUP ALIGNMENT SYSTEM

Wolfgang K. H. Panofsky, Los Altos Hills, and William F. Marshall, San Carlos, Calif., assignors to the United States of America as represented by the United States Atomic Energy Commission Filed Mar. 22, 1967, Ser. No. 625,920
Int. Cl. G01r *33/02*
U.S. Cl. 324—34 5 Claims

ABSTRACT OF THE DISCLOSURE

The disclosure relates to a system for indicating physical alignment of an object with respect to a stretched reference wire to which an alternating current signal is continuously applied. Window-type pickup magnets for pickup of the signal are mounted at sensing stations on the object. Initially, the object is placed in alignment by other means. Thereafter, any transverse movement of the object causes movement of the pickup magnets away from their centered position. Upon being even slightly off-centered, signals are induced from the reference wire to the magnets. The magnet windings are connected to produce a resultant signal that may be rectified to a direct current signal. The level of the direct current signal indicates the amount of misalignment of the object, while its polarity indicates the direction of misalignment.

The invention disclosed herein was made under, or in, the course of Contract No. AT(04–3)–400 with the United States Atomic Energy Commission.

BACKGROUND OF THE INVENTION

This invention relates to magnetic pickup systems, and more particularly to a system for indicating the relative position of an electrically energized reference wire with respect to a pickup magnet.

At the target end station of a long linear accelerator, it is found desirable to locate a spectrometer which is comprised of a series of large bending magnets having central fields through which the accelerator beam is passed. The central fields of several of these bending magnets must be accurately aligned and the alignment continuously maintained within 0.006″ as the angle of the spectrometer is changed during operation of the accelerator. Initially, the bending magnets may be aligned using conventional surveying techniques. Thereafter, however, the spectrometer is inaccessible to personnel due to the radiation hazard. For this reason, as well as ease of operation, monitoring and realignment of the bending magnets must be done remotely. In order to achieve continuous accuracy of alignment, it is desirable that the system be highly sensitive to minute changes of alignment and independent of temperature changes. Moreover, it is desirable that the system be adaptable for either manual or automatic operation, and that all of the above objectives be achieved simple and economically.

SUMMARY OF THE INVENTION

According to the present invention, an alternating current signal is applied to a reference wire stretched through the window of a window-type pickup magnet to determine the degree of relative misalignment between the wire and pickup magnet.

Briefly, the core of each pickup magnet is comprised of two legs with a winding on each leg. With the reference wire centered in the pickup magnet window or aperture, the AC signal is induced equally in the windings. The windings are connected to buck, i.e., the windings are connected so that the signals induced in each leg are 180° out of phase with the signals in the opposite leg. Therefore, with the reference wire centered in the window, the resultant signal from each pickup magnet is zero.

When the device on which the pickup magnets are mounted is moved, the pickup magnet window becomes off-centered with respect to the reference wire. The leg closest to the reference wire picks up a larger signal than the other leg; and the more off-centered the window becomes, the greater the amplitude of the signal in the closest leg and the smaller the signal in the furthest leg. Since the two signals are 180° out of phase and bucking, the resultant signal is in phase with the larger signal and has an amplitude equal to the difference of amplitudes of the two signals. The phase relationship between the AC signal applied to the reference wire and the resultant signal indicates the direction the window is off-centered from the wire, while the amplitude of the resultant signal indicates the distance off-center. The amplitude of the resultant signal is dependent only on the differential distances to the legs, and is not affected by the nearness of the reference wire to the ends of the legs. Therefore, two pickup magnets are needed to determine the off-center distance in an X—Y plane transverse to the reference wire.

Sensing stations may be provided at various locations on the object to be aligned. Each sensing station comprising two pickup magnets, one pickup magnet indicates movement in an X direction, and the other magnet, with its windings oriented at 90° with respect to the windings on the first pickup magnet, indicates movement in the Y direction.

Upon misalignment of the object, the resultant signals from the pickup magnets may be appropriately transduced to a display for remote manual realignment of the object; or the transduced signals may be transmitted to a computer for processing and appropriate activation of devices, such as adjustable jacks, to restore the object to its aligned position.

For a more complete theoretical and mathematical explanation of the invention, reference is made to a Technical Note, The Use of a Magnet Pickup as an Alignment Indicator with a Stretched Wire Technique and Proposed Systems and Circuits for Magnetic Alignment Pickups by W. K. H. Panofsky and W. F. Marshall, Stanford Linear Accelerator Center, Stanford, Calif.

An experimental alignment system exemplifying the invention was found to indicate a relative movement of the reference wire in the pickup magnet window of one part in 1000 parts between the center position and each extreme position where the total excursion within the window was 0.400″. Thus an indication of movement as small as $\frac{2}{10,000}$ of an inch was detected. The experimental system was used to detect the flexure of a seemingly rigid 24″ diameter girder pipe, unsupported over 40′, when a finger was pressed against the beam.

It should be understood, however, that the use of the invention is not limited to large structures or useful only when a high degree of accuracy is desired. The invention should also be useful with other structures or objects, both large and small, for determination of the amount and direction of relative movements. The invention could, for example, be used to detect relative earth movements or provide an indication of movements of very large structures such as dams.

It is an object of the invention to provide an improved arrangement for accurately, sensitively and continuously indicating the degree of physical alignment of an object with respect to an established reference.

Another object is to indicate the degree of relative physical alignment between a reference wire and pickup device by electrically energizing the wire to produce a signal in the pickup device indicative of their alignment.

Another object is to produce a direct current signal having a polarity and level indicative of the degree of relative physical alignment between a reference wire and pickup device.

Other objects and advantageous features of the invention will be apparent in a description of a specific embodiment thereof, given by way of example only, to enable one skilled in the art to practice the invention more readily, and described hereinafter with reference to the accompanying drawing.

DESCRIPTION OF AN EMBODIMENT

Figures 1, 2:
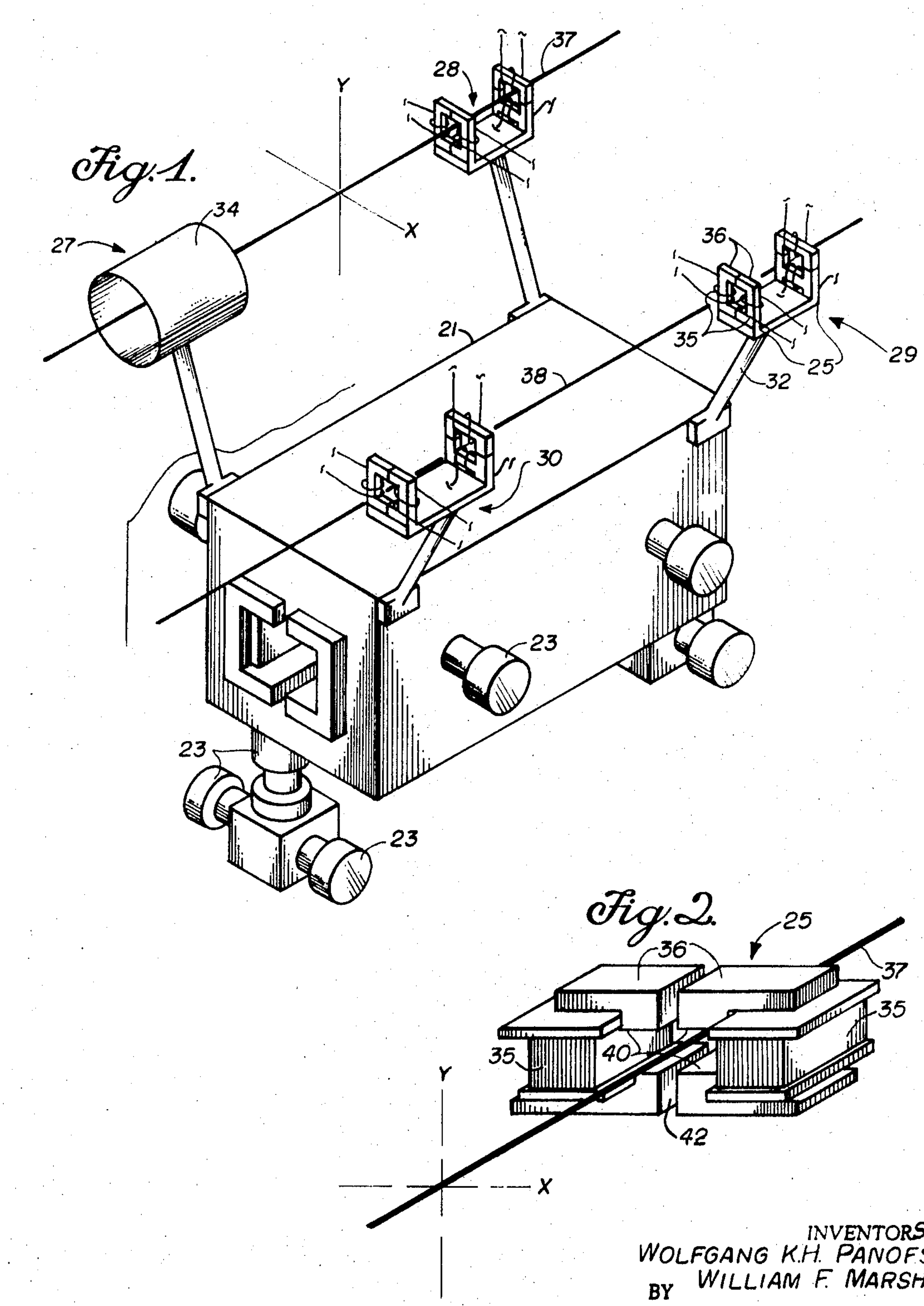
FIGURE 1 is an axonometric view of a spectrometer bending magnet shown with window-type pickup magnets diagrammatically represented and mounted thereon in alignment with a pair of stretched reference wires according to the invention.
FIGURE 2 is an axonometric view of the type of window magnet that may be used as a pickup magnet in FIGURE 1.

For a detailed description of an embodiment of the invention, reference is made to FIGURE 1, wherein a large bending magnet 21 is shown mounted on adjustable jacks 23 for use as a part of a spectrometer. The jacks 23 may be judiciously placed as shown to support the magnet 21 and to control its position in the X and Y directions. A spectrometer generally comprises other large bending and focusing magnets (not shown), all of which must be maintained in predetermined alignment and which may be similarly mounted.

Initially, the large bending and focusing magnets in a spectrometer are moved by their respective jacks to align the centers of their magnetic fields along a predetermined path. This initial alignment is determined by means of conventional surveying techniques. Thereafter, any transverse movement of a bending magnet is detected according to the invention by window-type pickup magnets 25 mounted at sensing stations 27, 28, 29 and 30 on the bending magnet 21. Each sensing station is comprised of a pair of pickup magnets 25, suitably mounted on an arm 32 extending from the bending magnet. Each pickup magnet 25 comprises a pair of windings 35 on opposite legs 36. The pickup magnets at each sensing station are oriented so that the windings of one magnet are parallel to the X-axis, while the other magnet is oriented to have its windings parallel to the Y-axis. An axonometric view of a pickup magnet 25 is shown in FIGURE 2 wherein the X—Y coordinates are indicated and the windings are shown oriented parallel to the Y-axis. Magnetic shielding 34 is provided at each sensing station, but shown in FIGURE 1 only at station 27. Such shielding prevents interaction of the field of the bending magnet 21 or other external fields with the pickup magnets.

With the large bending magnet 21 in its initially aligned position, wires 37 and 38 are stretched through the windows of the pickup magnets. The pickup magnets are adjusted so as to have the exact center of each window coincide with respective reference wires. Thereafter, any transverse movement of the bending magnet away from its aligned position causes movement of the pickup magnets away from their centered position. Upon being even slightly off-centered, alternating current signals applied to the reference wires are induced from the reference wires to the pickup magnets and then transduced to direct current signals having a level and polarity indicative of the degree of misalignment of the bending magnet 21.

In order for the signals induced in the magnets 25 to linearly correspond to the degree of misalignment of the magnet with respect to the wire, it has been found that opposing faces 40 (FIGURE 2) of the pickup magnet window must be substantially parallel. It has also been found that provision of a gap 42 results in a pickup magnet having an increased sensitivity over pickup magnets without gaps.

Figure 3:
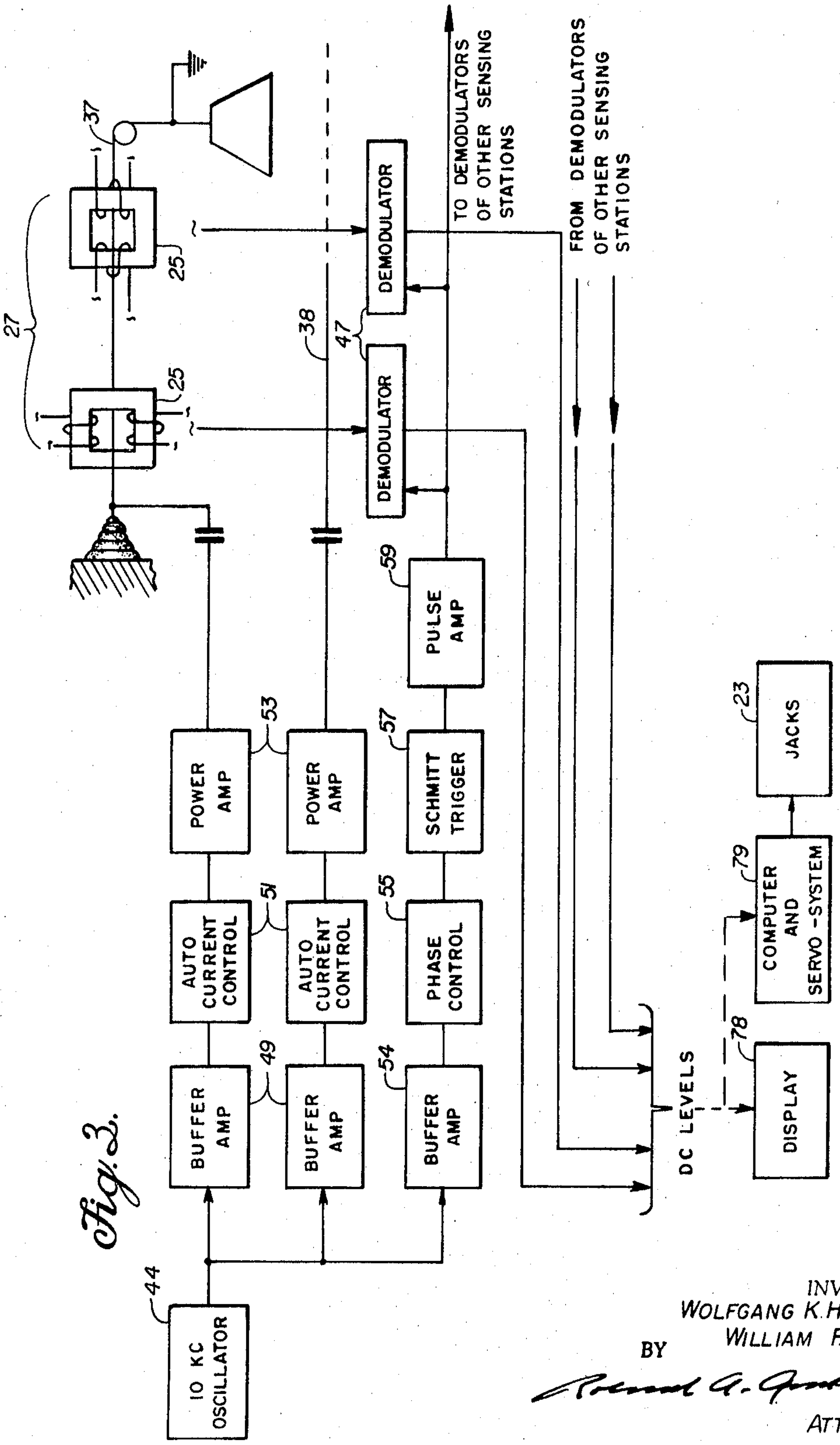
FIGURE 3 is a block diagram of an electronic system for applying alternating current signals to the stretched reference wires of FIGURE 1, and for transducing the signals pickup up by the pickup magnets to direct current voltage levels indicative of the degree of alignment of the pickup magnets, and therefore the spectrometer magnet, with respect to the stretched reference wires.

In FIGURE 3, a block diagram is shown of an electronic system for applying AC signals from a signal generator 44, which conveniently may be a conventional 10 kc. oscillator, to the stretched reference wires 37 and 38. The AC signal is induced into pairs of pickup magnets at the sensing stations 27, 28, 29 and 30. However, only the sensing station 27 with its two pickup magnets 25 is indicated in FIGURE 3. Associated with each pickup magnet is a demodulator 47. Each demodulator rectifies the signal transmitted thereto, in a manner more fully discussed hereinafter, to develop a DC signal having a voltage level and polarity corresponding to the misalignment of the center of the window of the pickup magnet with respect to the reference wire.

The signal generator 44 generates a sine wave signal which is amplified by conventional buffer amplifiers 49 for application to respective stretched wires 37 and 38. The current of the signal may be controlled by an automatic current control circuit 51 which may be of conventional design to obtain an AC signal of constant amplitude for precise calibration of the system. The signal may be further amplified by a conventional power amplifier 53 before application to respective stretched reference wires.

The AC signals are also applied through a buffer amplifier 54 and a conventional phase control circuit 55 to a Schmitt trigger 57 for generating square waves. The square waves are applied by a conventional pulse amplifier 59 to all of the demodulators 47, including the demodulators associated with the other sensing stations, for use as phase reference signals.

Figure 4:
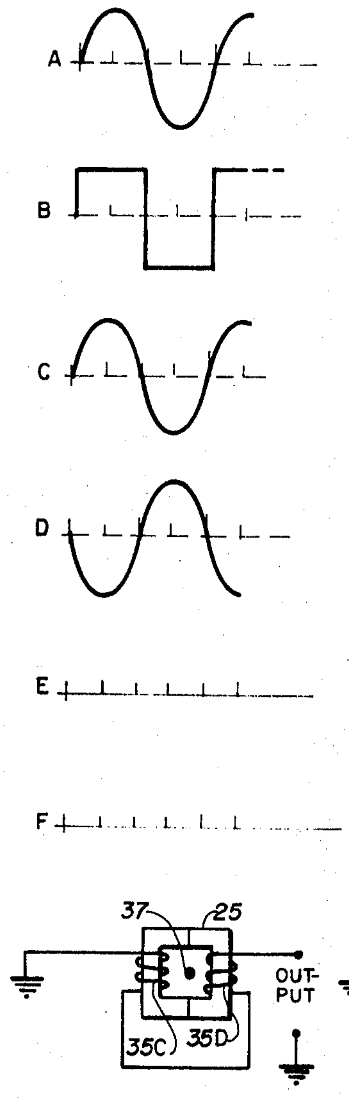
FIGURE 4, lines A–F, is a graphic representation of pulses and levels at various points in the system of FIGURE 3 when a pickup magnet is aligned with its reference wire.

On line A, FIGURE 4, is represented a sine wave that may be applied to the stretched reference wires 37 and 38. On line B is represented the square wave applied to all of the demodulators. The phase relationship of the square wave is controlled by the phase control circuit 55 to ensure that the sine waves applied to the demodulators 47 from the pickup magnets 25 and the square waves applied to the demodulators alternate simultaneously. The phase control circuit 55 is necessary to compensate for phase delays that occur in the circuitry between the oscillator 44 and the demodulators, the largest phase delay occurring between the reference wire and the pickup magnets 25.

On line C, FIGURE 4, is represented the sine wave induced in one winding of a pickup magnet when the reference wire, e.g., wire 37, is in the center of the window. A representative pickup magnet 25, with the wire centered in the window, is shown in FIGURE 4 below line F. The signal shown on line C is that induced in the winding 35C. On line D is represented an equal sine wave induced in the winding 35D on the opposite leg of the pickup magnet. Since the windings 35C and 35D are connected to buck, the signals therein are shown 180° out of phase. On line E is represented the resultant signal appearing at the output of the pickup magnet; and since the signals in the windings 35C and 35D are equal and 180° out of phase, the resultant signal is zero. On line F is represented the resulting zero voltage level of the DC signal output from the associated demodulator 47 (FIGURE 3).

Figure 5:
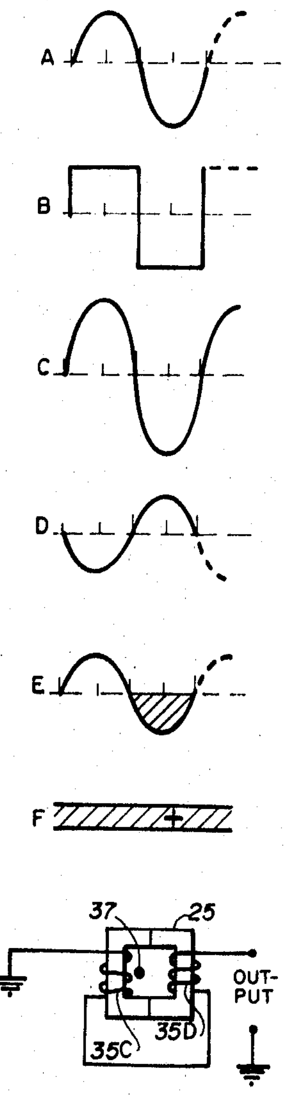
FIGURE 5, lines A–F, is a graphic representation of pulses and levels at various points in the system of FIGURE 3 when a pickup magnet is misaligned with respect to its reference wire in a first direction.

On lines A and B (FIGURE 5), the sine wave applied to the reference wires and the square wave applied to the demodulators are again represented, as described above with reference to FIGURE 4. On line C is represented the signal induced in winding 35C of the pickup magnet 25 when the reference wire 37 is nearest that winding, as shown diagrammatically below line F in FIGURE 5. The amplitude of this signal is larger than the signal shown on line C (FIGURE 4) since the reference wire 37 and winding 35C are now closer together. On line D (FIGURE 5) is represented the signal induced in the winding 35D under these conditions. The amplitude of this signal is lower than the signal shown on line D (FIGURE 4) since the winding 35D is now further from the reference wire. Since the windings on the pickup magnet 25 are connected to buck, the signals shown on lines C and D are 180° out of phase. On line E is shown the resultant signal which may be derived by adding the signals represented on lines C and D. As discussed in more detail hereinafter, the leading half of the resultant wave (line E) is transduced to a DC signal by an associated demodulator 47. This signal is used to charge a smoothing capacitor to a positive DC voltage level which is represented on line F. This level is proportional to the amplitude of the leading and positive half of the resultant wave on line E. The positive polarity of the DC signal indicates the direction in which the window is off-centered, while the amplitude of the signal indicates the distance that the window is off-centered. The closer the reference wire 37 approaches the winding 35C, the greater will be the amplitude of the signal induced therein, and conversely the smaller will be the signal induced in winding 35D. Consequently, as the wire 37 and winding 35C move closer together, the amplitude of the resultant signal will increase, causing the smoothing capacitor to charge to a higher positive DC voltage level.

Figure 6:
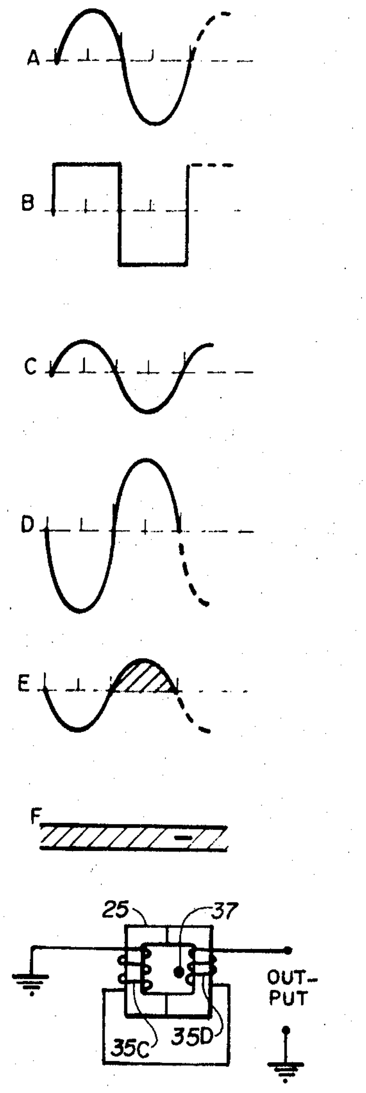
FIGURE 6, lines A–F, is a graphic representation of pulses and levels at various points in the system of FIGURE 3 when a pickup magnet is misaligned in a direction opposite to that represented in FIGURE 5.

Should the pickup magnet 25 become off-centered so that the reference wire 37 is nearest the winding 35D, the signal conditions will be those represented in FIGURE 6. The signal shown on line C will become smaller since the winding 35C is now furthest from the wire, while the signal shown on line D will become larger, being in the winding closest to the wire. The leading half of the resultant signal shown on line E will now be negative since the signal in winding 35D is now the larger signal. Since only the leading half of the resultant signal is rectified, the polarity of the DC signal will be negative and have a voltage level proportional to the amplitude of the resultant signal.

The degree of alignment between the reference wire and pickup magnet could be detected, for example by observing the AC signals and the resultant signals on an oscilloscope. In practice, however, it has been found desirable to rectify or demodulate the resultant signals by means of an associated demodulator 47 which may conveniently be of the type shown in detail in FIGURE 7. Each demodulator 47 (FIGURE 7) may be comprised of a conventional non-inverting operational amplifier 61 to which the resultant signal of the associated pickup magnet 25 is applied. A capacitor 62 is provided across the legs of the pickup magnet to tune the circuit to the AC signal and exclude the harmonic components in the signal. A resistor 64 is provided across the capacitor 62 to lower the "Q" of the circuit and thereby provide a relatively wide bandwidth near the frequency of the AC signal. This ensures that a significant signal is applied to the operational amplifier despite any slight deviation from the frequency of the AC signal due to inductance changes during operation of the circuit or variations of component values during production of the pickup magnets or circuits. A conventional negative feedback circuit 65 is provided from the output to the input of the operational amplifier 61.

Signals from the operational amplifier are applied to a transistor 67 which rectifies the signals for developing the DC voltage level. Application of the resultant signal such as shown on line E (FIGURE 5) to the collector of the transistor 67 results in a DC level such as shown on line F. A square wave having the polarity and phase of the signal shown on line B is applied from the pulse amplifier 59 (FIGURE 3) through a coupling circuit comprising resistors 69 and 70 to the base of the transistor. When the positive half of the square wave is applied to the base of the transistor, the transistor is cut off thereby to ensure a high impedance from collector to ground. Thus, the positive half of the resultant signal applied from the amplifier 61 to the collector is conducted through a resistor 73 to the smoothing capacitor, a capacitor 75. During the negative half of the signal shown on line E, the negative half of the square wave shown on line B is applied to the base of the transistor 67, causing it to conduct in the saturation region. The negative signal applied to the collector is thereby shunted to ground. The resistor 73 is provided between the collector of transistor 67 and capacitor 75 to prevent discharge of the capacitor when the transistor shunts the negative signal to ground. During succeeding cycles of the signal shown on line E, the charge on the capacitor 75 is raised to a steady state level such as shown on line F. The positive polarity of this signal indicates the direction of misalignment, while the amplitude indicates the amount of misalignment.

Figure 7:
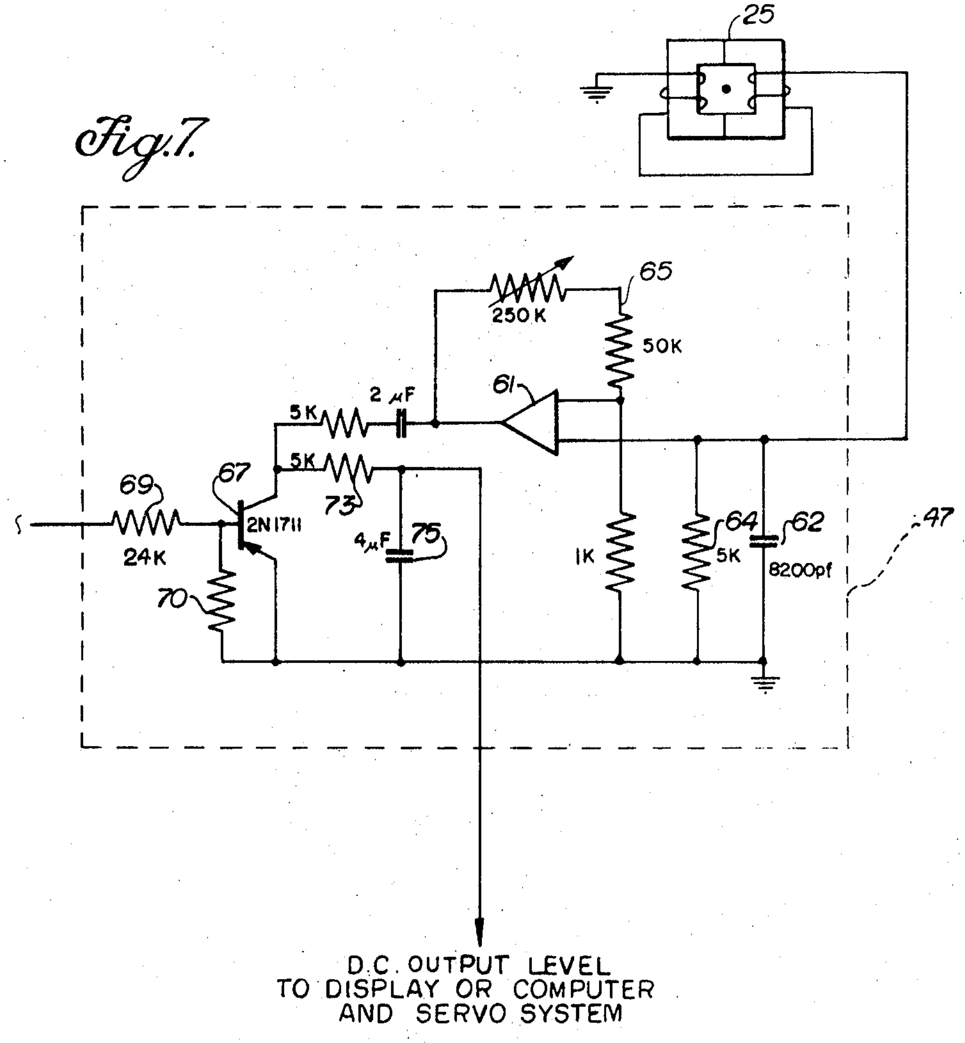
FIGURE 7 is a circuit diagram of a demodulator, represented in block form in FIGURE 3, for transducing alternating current signals from a pickup magnet to a direct current voltage level to thereby indicate the degree of alignment of the pickup magnet with respect to a stretched reference wire.

When the window of a pickup magnet 25 is misaligned with respect to the wire 37 so that wire 37 and winding 35D are closer, the signals are similar to those shown on lines A–F (FIGURE 6). During the negative half of the resultant signal shown on line E, the positive portion of the square wave shown on line B is applied to the base of the transistor 67 (FIGURE 7). The transistor is cut off thereby to ensure a high impedance from the collector to ground. The negative signal is directed therefor through resistor 73 to the capacitor 75 to accumulate a negative charge thereon over a series of cycles. During the positive portion of the resultant signal, the negative half of the square wave shown on line B is applied to the base of the transistor, causing conduction of the transistor from collector to base. This causes the positive portion of the signal shown on line E to be shunted to ground. Over a series of cycles, the capacitor 75 is charged thereby to a steady state negative voltage level proportional to the amount of misalignment between the window of the pickup magnet and the reference wire, the polarity of the voltage indicating the direction of misalignment.

The DC voltage levels from the various demodulators may be used to operate a conventional display unit 78 (FIGURE 3). The display would indicate the adjustment required of the jacks 23 (FIGURE 1) to bring the bending magnet 21 to its aligned position. Alternatively, alignment could be maintained by applying the DC voltage levels to a computer 79 for continuous automatic control of a servo system connected to the jacks 23.

In the experimental alignment system exemplifying the invention, a pickup magnet was constructed having a Hypersil® alloy transformer core comprised of 0.001 inch thick laminations, a window 0.2" x 0.4", and a gap of 0.007". Two windings were provided on the core, each having 500 turns. A 0.005" diameter high tensile steel piano wire was stretched through the aperture and a kc. signal applied thereto. Nominal 2-volt signals were obtained across each winding, while the maximum difference between the two signals was 12 millivolts. A demodulator was constructed for the system, and comprised components having the nominal values indicated in FIGURE 7.

While an embodiment of the present invention has been shown and described, further embodiments or combinations of those described herein will be apparent to one skilled in the art without departing from the spirit of the invention or from the scope of the appended claims.

We claim:

1. An alignment system comprising:

(a) a first pickup magnet including a core having sides which define an aperture,
 a first winding on said core,
 a second winding on said core connected to said first winding in phase opposition;

(b) a first reference wire stretched through said aperture in predetermined alignment therewith;

(c) a signal generator for applying an alternating current signal to said wire, said signal being induced through said core to said oppositely connected first and second windings, a resultant signal being produced thereby which is the difference of the signals produced in the respective windings;

(d) a square wave generator driven by said signal generator for producing a square wave;

(e) means for synchronizing alternations of said square wave with alternations of said resultant signals; and (f) first detecting means coupled to said first and second windings and said signal generator for detecting the amplitude of the resultant signal and its phase relation with respect to said square wave, whereby the phase relation of the resultant signal indicates the direction of relative misalignment between said magnet and said wire, and the amplitude of the resultant signal indicates the amount of such misalignment, said detecting means including
 a switching device having first and second current conducting electrodes and a control electrode for regulating the current therebetween,
 means for applying the resultant signal from said pickup magnet to said first electrode,
 means for applying said synchronized square wave to said control electrode to bias said device to cutoff during a predetermined square wave phase and to saturation during the remainder of the period of said resultant signal, and
 charge storage means coupled to said first electrode, said switching device being operable to direct the electric charge of said resultant signal to said storage means during said predetermined square wave phase, said device directing to said storage means an electric charge having a first polarity upon said resultant signal having a first phase relationship with said square wave, said device directing to said storage means an electric charge having a second polarity upon said resultant signal having a second phase relationship with said square wave.

2. An alignment system according to claim 1, and further including:

(a) a sensing station comprised of
 said first pickup magnet and said first detecting means,
 a second pickup magnet, said second magnet including a core having sides which define an aperture, first and second windings connected together in phase opposition and wound on the core of said second magnet with their axes oriented at 90° with respect to the axes of the windings on said first pickup magnet, said second pickup magnet positioned with said reference wire stretched through its aperture in predetermined alignment therewith, and
 second detecting means coupled to the windings of said second pickup magnet and said signal generator for detecting the amplitude of the resultant signal therefrom and its phase relation with respect to said square wave;

(b) an object in a reference position having a plurality of said sensing stations mounted thereon in predetermined alignment with said reference wire;

(c) a plurality of adjustable jacks supporting said object; and (d) control means coupled to said plurality of sensing stations and responsive to output signals therefrom, upon movement of said object from its reference position, for adjusting said jacks to return said object to its reference position.

3. An alignment system according to claim 2, wherein said charge storage means includes a smoothing capacitor.

4. An alignment system according to claim 2 wherein said object is a spectrometer, and each of said sensing stations includes a cylindrical magnetic shield coaxial with said reference wire and surrounding said first and second pickup magnets of each of said sensing stations.

5. An alignment system according to claim 1, further including:

a capacitor connected across said first and second windings for excluding harmonic components in signals from said first and second windings; and a resistor connected across said first and second windings to provide a relatively wide bandwidth near the frequency of said alternating current signal.

References Cited

UNITED STATES PATENTS

| | | | |
|---|---|---|---|
| 2,779,916 | 1/1957 | Poole | 324—34 |
| 3,003,122 | 10/1961 | Gerhard | 332—9 |

FOREIGN PATENTS

| | | |
|---|---|---|
| 996,403 | 6/1965 | Great Britain. |

RUDOLPH V. ROLINEC, Primary Examiner

R. J. CORCORAN, Assistant Examiner

U.S. Cl. X.R.

329—20.640; 329—101